(12) United States Patent
Yoshimura et al.

(10) Patent No.: US 6,440,292 B2
(45) Date of Patent: Aug. 27, 2002

(54) METHOD FOR FORMING A THIN FILM

(75) Inventors: Masahiro Yoshimura; Takeshi Fujiwara, both of Kanagawa Pref.; Seung-wan Song; Tomoaki Watanabe, both of Tokyo; Ryo Teranishi, Kanagawa Pref., all of (JP); Kyoo-Seung Han, Taejeon (KR)

(73) Assignee: Tokyo Institute of Technology, Tokyo (JP)

( * ) Notice: Subject to any disclaimer, the term of this patent is extended or adjusted under 35 U.S.C. 154(b) by 0 days.

(21) Appl. No.: 09/810,781

(22) Filed: Mar. 16, 2001

(30) Foreign Application Priority Data

Mar. 17, 2000 (JP) .......................... 2000-76578

(51) Int. Cl.[7] .............................. C25D 9/00; C25D 5/54
(52) U.S. Cl. ........................................ 205/333; 205/161
(58) Field of Search ...................... 205/109, 59, 161, 205/324, 333, 149, 57

(56) References Cited

U.S. PATENT DOCUMENTS

| 3,520,780 A | 7/1970 | Findl et al. ..................... 204/3 |
| 5,597,661 A | 1/1997 | Takeuchi et al. ............... 429/42 |

FOREIGN PATENT DOCUMENTS

| EP | 0 319 489 | 11/1988 |
| JP | 09-293501 A | * 11/1997 |
| JP | 10-326619 A | * 12/1998 |

OTHER PUBLICATIONS

Yoshimura et al. "Direct Fabrication Of Thin–Film Linio$_2$ Electrodes in lioh Solution By Electricochemical–Hydrothermal Method." Solid State Ionics 106 (1998) pp. 39–44, No Month Available.

Han et al. "Simultaneous And Direct Fabrication Of Lithium Cobalt Oxide Film And Powder Using Soft Solution Processing At 100°C." Electromechanical and Soil–State Letters. 2(2) Feb. 1999. pp. 63–66.

* cited by examiner

*Primary Examiner*—Edna Wong
(74) *Attorney, Agent, or Firm*—Knobbe, Martens, Olson & Bear, LLP

(57) ABSTRACT

A blended solution is made by melting $LiOH.H_2O$ into distilled water, and then, Co metallic powders are added into the blended solution to make a reactive solution. The reactive solution is charged into an autoclave, and held at a predetermined temperature. Then, a pair of platinum electrodes are set into the reactive solution, and a given voltage is applied between the pair of platinum electrode. As a result, a compound thin film, made of crystal $LiCoO_2$ including Li element of the blended solution and Co element of the Co metallic powders, is synthesized on the platinum electrode constituting the anode electrode.

5 Claims, 2 Drawing Sheets

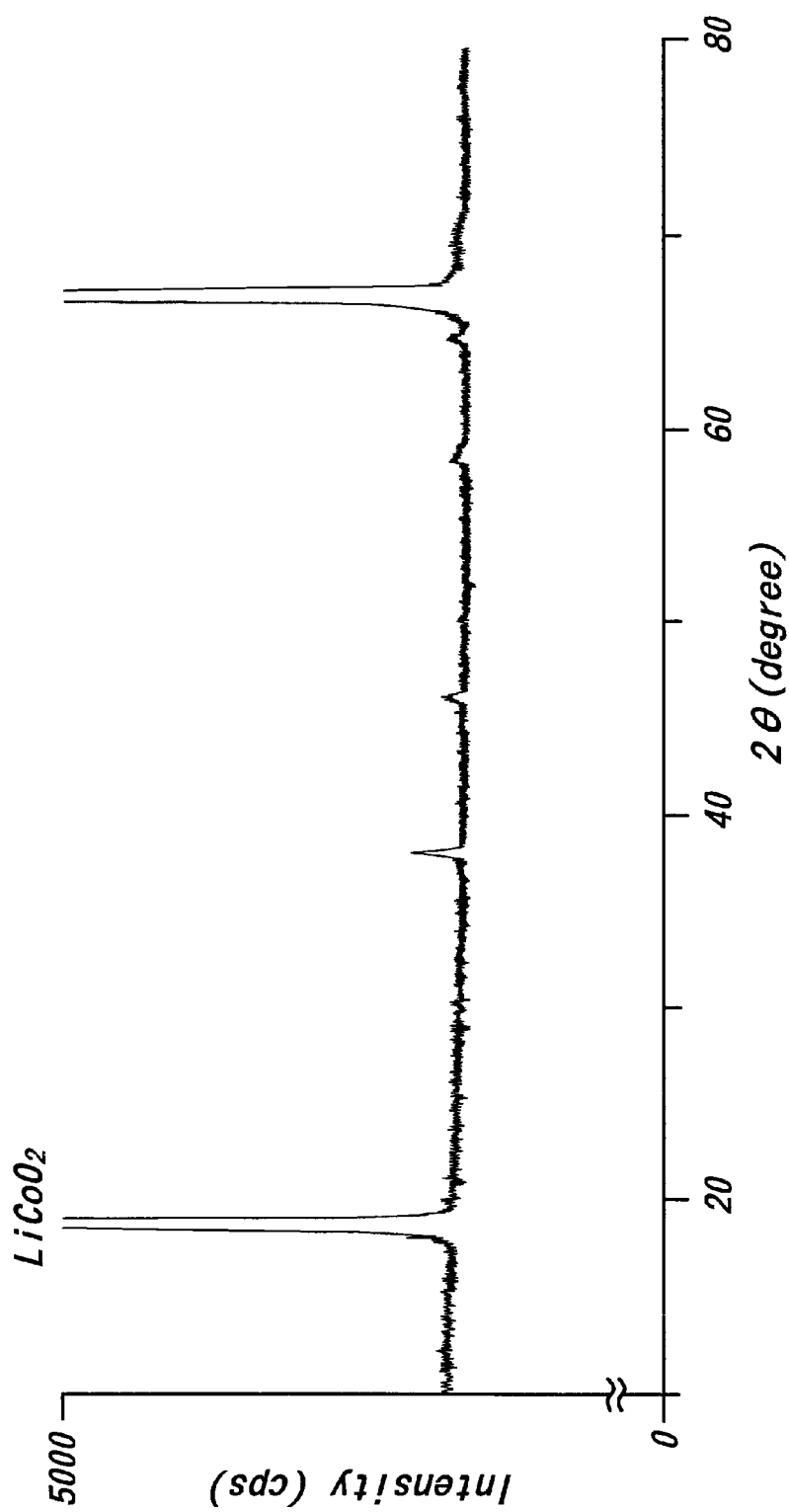

METHOD FOR FORMING A THIN FILM

BACKGROUND OF THE INVENTION

1. Field of the Invention

This invention relates to a method for forming a thin film, particularly to a method for forming a thin film suitable for a secondary battery field usable for mobile electronic device and electric automobiles.

2. Related Art Statement

So far, a sol-gel method, a CVD method or a PVD method is employed as a thin film-forming method. These methods require a multi-stage process including a heating process, a high vacuum condition, or a high energy condition accompanied with a substrate-heating process or a plasma-generating process. Therefore, those methods require large scale and complicate apparatus, resulting in large cost and complicate operationality in use.

Moreover, the above high energy condition runs counter to global environmental protection, resource saving and energy saving. Therefore, a new thin film-forming method without the above high energy condition has been desired.

SUMMERY OF THE INVENTION

It is an object of the present invention to provide a new thin film-forming method not including a high energy condition due to firing, heating or plasma generation.

This invention relates to a method for forming a thin film comprising the steps of:

preparing a reactive solution by adding metallic powders or metallic compound powders into a blended solution, setting an anode electrode and a cathode electrode in the reactive solution, applying a given voltage between the anode electrode and the cathode electrode, thereby to synthesize a compound thin film including the components of the blended solution and the metallic powders or the metallic compound powders on the anode electrode.

The inventors related to the present invention have been intensely studied for developing a new thin film-forming method not including a high energy process. As a result, they have found out surprisingly that when a reactive solution is made of a blended solution in which a given substance is dissolved and a given metallic powders added into the blended solution, and then, a given voltage is applied between a cathode electrode and an anode electrode provided in the reactive solution, a compound thin film composed of the components of the blended solution and the metallic powders is formed on the anode electrode, which is not pre-treated and heated. Then, since the compound thin film exhibits crystallinity, it is turned out that the components are reacted and synthesized on the anode electrode to form the crystalline compound thin film.

On the other hand, when only a blended solution incorporating components of a compound thin film to be formed is employed without metallic powders or metallic compound powders, the compound thin film is not formed or is formed very slowly on the anode electrode.

That is, it is required in this invention to use a reactive solution made of a given blended solution and given metallic powders or metallic compound powders. As a result, a compound thin film is made of the components of the blended solution and the metallic powders or metallic compound powders.

This invention has been established on the basis of the discovery of the above fact.

In a preferred embodiment of the thin film-forming method of the present invention, a substrate made of a porous material is set on a surface of the anode electrode opposite to the cathode electrode. In this case, the components of the blended solution and the metallic powder or metallic compound powders pass through the substrate freely, and arrive at the surfaces of the substrate. Therefore, the components are directly reacted on the substrate, and thus, the compound thin film is directly synthesized from the above components on the surfaces of the substrate.

If the given voltage is not applied to the reactive solution, the compound thin film is not formed. Therefore, if the anode electrode is formed in a predetermined patterned shape, the compound thin film can be synthesized in a given pattern corresponding to the patterned anode electrode.

According to the thin film-forming method of the present invention, the crystalline compound thin film can be formed on the anode electrode or the porous substrate without a pre-treating process, etc.

BRIEF DESCRIPTION OF THE DRAWINGS

The invention will be more particularly described with reference to the accompanying drawings:

FIG. 2 is a graph showing the X-ray diffraction spectrum of another $LiCoO_2$ thin film synthesized by the thin film-forming method of the present invention.

DESCRIPTION OF THE PREFERRED EMBODIMENTS

Figure 1:
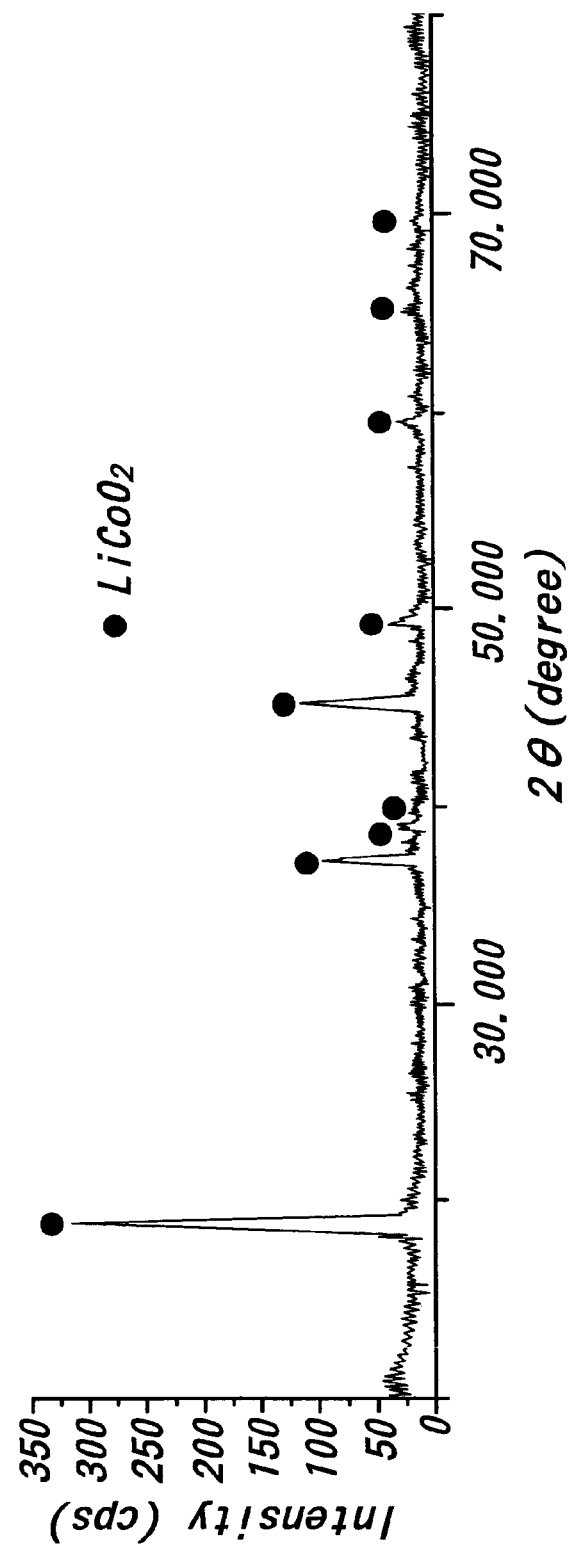
FIG. 1 is a graph showing the X-ray diffraction spectrum of a $LiCoO_2$ thin film synthesized by the thin film-forming method of the present invention.

The invention will be described in detail as follows.

According to the present invention, the compound thin film can be synthesized without a high energy process, but an additional energy process such as a heating process is not always excluded. Preferably, the reactive solution is heated to 60–300° C., particularly 100–200° C. Thereby, the compound thin film can be uniformly synthesized on the anode electrode or the porous substrate provided on the anode electrode and the density of the compound thin film can be enhanced, irrespective of the kind of the reactive solution, that is, the kinds of the blended solution and the metallic powders or metallic compound powders.

In a conventional wet thin film-forming method such as a sol-gel method, a thin film is formed of a given solution and dried, and then, heated and fired at 500–800° C. to synthesize a desired crystalline compound thin film. Therefore, the high temperature firing process is required.

Moreover, in the CVD method, a substrate is normally heated to 500–800° C. Therefore, the additional energy process of the thin film-forming method of the present invention is very small in energy, compared with the above high energy process in the sol-gel method or the CVD method.

The amplitude of the voltage to be applied between the cathode electrode and the anode electrode is not restricted only if the compound thin film can be uniformly synthesized directly on the anode electrode or the porous substrate provided on the anode electrode. Preferably, the amplitude of the voltage is selected so that a current with a current density of 0.01–10 $mA/cm^3$ is flown in between the electrodes. Thereby, the components of the blended solution and the metallic powders or the metallic compound powders are dissociated in their respective enough amounts to synthesize the compound thin film uniformly, irrespective of the kinds of the blended solution and the metallic powders or metallic compound powders.

In the thin film-forming method of the present invention, it is not always required to stand still the reactive solution. The reactive solution may be flown at a flow rate of 0.1–100 mL/minute. In both cases, the compound thin film can be synthesized uniformly according to the present invention.

The kinds of the blended solution and the metallic powders or metallic compound powders are determined on the kind of the compound thin film to be formed. Moreover, the concentration of the blended solution and the amount of the metallic powders or metallic compound powders are determined on the forming rate and the thickness of the compound thin film.

In this invention, the wording "metallic powders" or "metallic compound powders" means "metallic particles" or "metallic compound particles" having an average particle diameter of 0.01–100 $\mu$m, respectively.

Moreover, the cathode electrode and the anode electrode may be made of a well known electrode material such as carbon material, platinum material or cobalt material.

The porous base material may be made of Teflon, paper or cloth.

In the case of forming a thin film on the porous substrate, if the anode electrode is formed in a predetermined patterned shape as mentioned above, the compound thin film can be formed in a given patterned shape, corresponding to the patterned thin film. The anode electrode may have such a patterned shape as a dot-like shape, a lattice-like shape or a comb-like shape.

The thin film-forming method can be applied for any compound thin film, but may be preferably for the Co-based oxide thin film such as $LiCoO_2$, which is used as an electrode material of a lithium ion secondary battery, a V-based oxide thin film, a Mn-based oxide thin film, a Fe-based oxide thin film, a W-based oxide thin film and a Mo-based oxide thin film, which are employed as a fluorescent material and a luminescence material.

In this case, a well known oxidizer such as $Na_2S_2O_3$ or $H_2O_2$ can be preferably used.

EXAMPLES

This invention will be concretely described with reference to the following examples.

Example 1

First of all, 300 mL of a blended solution with a concentration of 7 mol/L of LiOH was made by melting LiOH•$H_2O$ into distilled water. Then, 0.2 g of Co metallic powders with an average particle diameter of 2 $\mu$m was added into the blended solution to make a reactive solution.

Then, the reactive solution was charged into an autoclave, and heated to 200° C. A pair of platinum electrodes, which were opposite each other, were set in the reactive solution as the anode electrode and the cathode electrode. Then, a given voltage was applied between the platinum electrodes to flow a current with a current density of 2.5 mA/cm² therebetween.

Two hours later, the platinum electrodes were taken out of the autoclave, and then, the surface of the platinum electrode constituting the anode electrode was examined by X-ray diffraction. The thus obtained result is shown in FIG. 1.

As is apparent from FIG. 1, diffraction peaks from $LiCoO_2$ are observed on the surface of the platinum electrode. That is, it is turned out that a compound thin film, made of $LiCoO_2$ crystal composed of Li element of blended solution and Co element of the metallic powders, is formed on the platinum electrode.

Example 2

Except that the concentration of LiOH in the blended solution was set to 5 mol/L and the current density between the platinum electrodes was set to 0.05 mA/cm³, the same processes as in Example 1 were carried out. Then, the surfaces of the platinum electrode constituting the anode electrode was examined by X-ray diffraction, as in Example 1. The thus obtained result is shown in FIG. 2.

As is apparent from FIG. 2, it is also turned out that a compound thin film, made of $LiCoO_2$ crystal composed of Li element of blended solution and Co element of the metallic powders, is formed on the platinum electrode.

Although this invention bas been described in detail with reference to the above examples, this invention is not limited to the above disclosure and every kind of variation and modification may be made without departing from the scope of the present invention.

For example, in the above examples, the blended solution is made by melting only one kind of LiOH.$H_2O$ into distilled water. However, the blended solution may be made of a water solution in which two or more substances are melted, depending on the composition of the compound thin film. Moreover, two or more kinds of metallic powders or metallic compound powders may be employed.

According to the present invention, a compound thin film can be directly synthesized on an anode electrode or a porous substrate provided on the anode electrode without a high energy condition including a high temperature substrate-heating process and a plasma-generating process in a conventional CVD method or PVD method. As a result, a new thin film-forming method not including the high energy condition can be provided.

What is claimed is:

1. A method for forming a thin film comprising the steps of:

preparing a reactive solution by adding metallic powders or metallic compounds powders into a blended solution, setting an anode electrode and a cathode electrode in the reactive solution, and applying a given voltage between the anode electrode and the cathode electrode, thereby to deposit and synthesize a compound thin film containing the components of the blended solution and the metallic powders or the metallic compound powders on the anode electrode.

2. A method for forming a thin film as defined in claim 1, wherein the reactive solution is heated and held at 60–300° C.

3. A method for forming a thin film as defined in claim 1 or 2, further comprising the step of setting a substrate made of a porous material at least onto a surface of the anode electrode opposite to the cathode electrode, whereby the compound thin film is synthesized on the substrate.

4. A method for forming a thin film as defined in claim 1 or 2, wherein the anode electrode has a predetermined patterned shape, and the compound thin film is formed in a given patterned shape, corresponding to the patterned shape of the anode electrode.

5. A method for forming a thin film as defined in claim 1 or 2, wherein the reactive solution is composed of the blended solution made by melting LiOH•$H_2O$ into distilled water and Co metallic powders added into the blended solution, and an oxide thin film including Li element and Co element is synthesized.

* * * * *